United States Patent
Kawase

(10) Patent No.: US 10,766,537 B2
(45) Date of Patent: Sep. 8, 2020

(54) VEHICLE SIDE PORTION STRUCTURE

(71) Applicant: TOYOTA JIDOSHA KABUSHIKI KAISHA, Toyota-shi (JP)

(72) Inventor: Kyosuke Kawase, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 191 days.

(21) Appl. No.: 16/013,406

(22) Filed: Jun. 20, 2018

(65) Prior Publication Data

US 2019/0047628 A1    Feb. 14, 2019

(30) Foreign Application Priority Data

Aug. 9, 2017 (JP) .................. 2017-153944

(51) Int. Cl.
*B62D 21/15* (2006.01)
*B62D 25/20* (2006.01)
*B62D 25/02* (2006.01)
*B62D 27/02* (2006.01)

(52) U.S. Cl.
CPC ......... *B62D 21/157* (2013.01); *B62D 25/025* (2013.01); *B62D 25/2036* (2013.01); *B62D 27/023* (2013.01)

(58) Field of Classification Search
CPC ............... B62D 21/157; B62D 25/025; B62D 25/2036; B62D 27/023
USPC .................................................. 296/187.12
See application file for complete search history.

(56) References Cited

U.S. PATENT DOCUMENTS 8,567,855 B2 * 10/2013 Gadhiya ............ B62D 21/152
                                                     296/203.02
2016/0001817 A1 * 1/2016 Atsumi ................ B60R 19/023
                                                     296/187.09

FOREIGN PATENT DOCUMENTS

| JP | 2007320341 A | * 12/2007 |
| JP | 2010-179898 | 8/2010 |
| JP | 2014-226957 | 12/2014 |
| JP | 2015-150927 | 8/2015 |

* cited by examiner

*Primary Examiner* — Joseph D Pape
*Assistant Examiner* — Dana D Ivey
(74) *Attorney, Agent, or Firm* — Oblon, McClelland, Maier & Neustadt, L.L.P.

(57) ABSTRACT

A vehicle side portion structure that includes: a pair of rockers arranged at each of two outer sides of a vehicle width direction of a floor panel of a vehicle, the rockers extending in a vehicle front-and-rear direction; and a plurality of cross-members that are arranged with length directions thereof in the vehicle width direction, both length direction end portions of each cross-member being fixed to the pair of rockers, and the cross-members being disposed to be spaced in the vehicle front-and-rear direction. A separation distance between neighboring cross-members in the vehicle front-and-rear direction is specified such that a bending reaction force of the rockers in response to an impact load applied during a side collision of the vehicle is equal to or greater than the impact load.

8 Claims, 7 Drawing Sheets

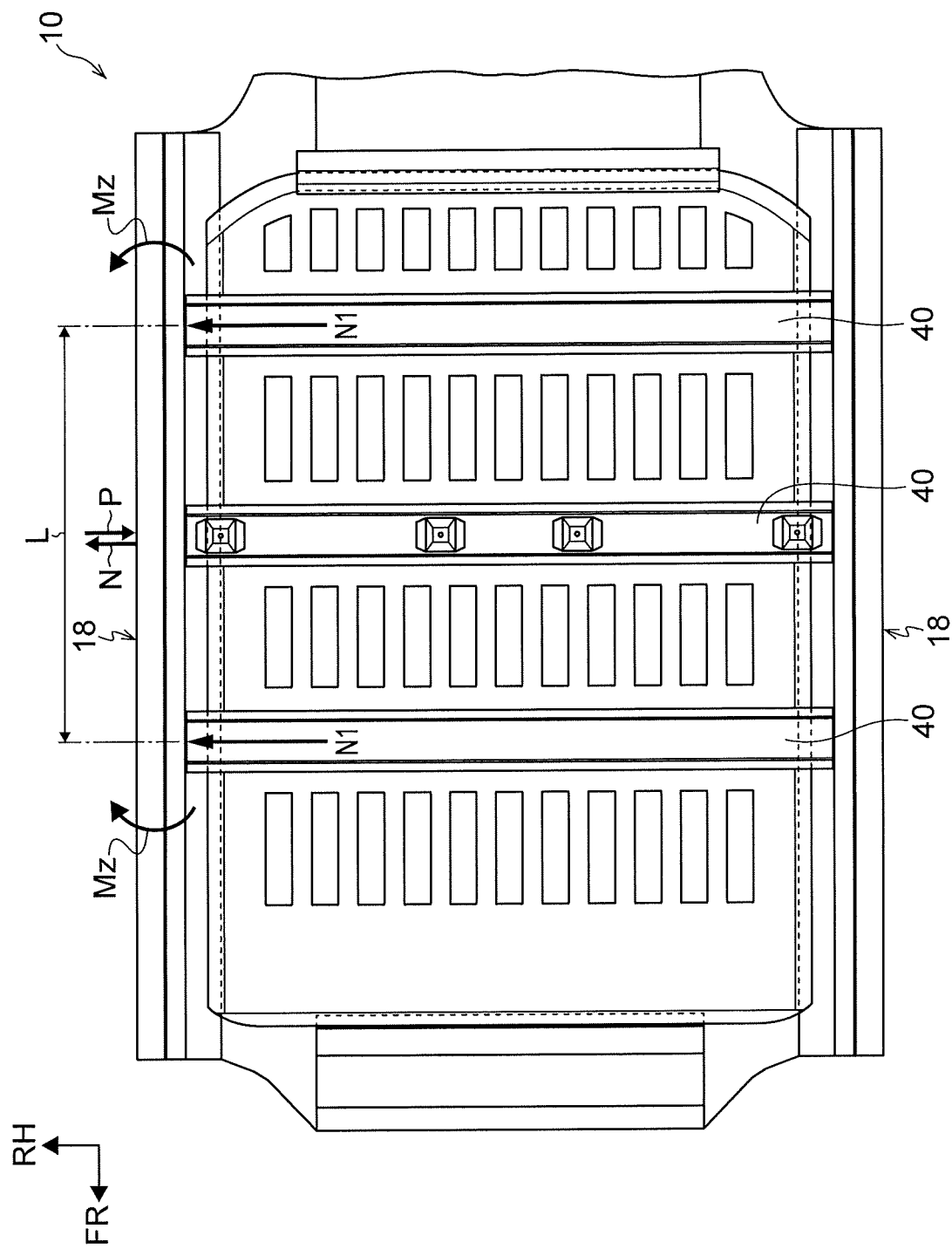

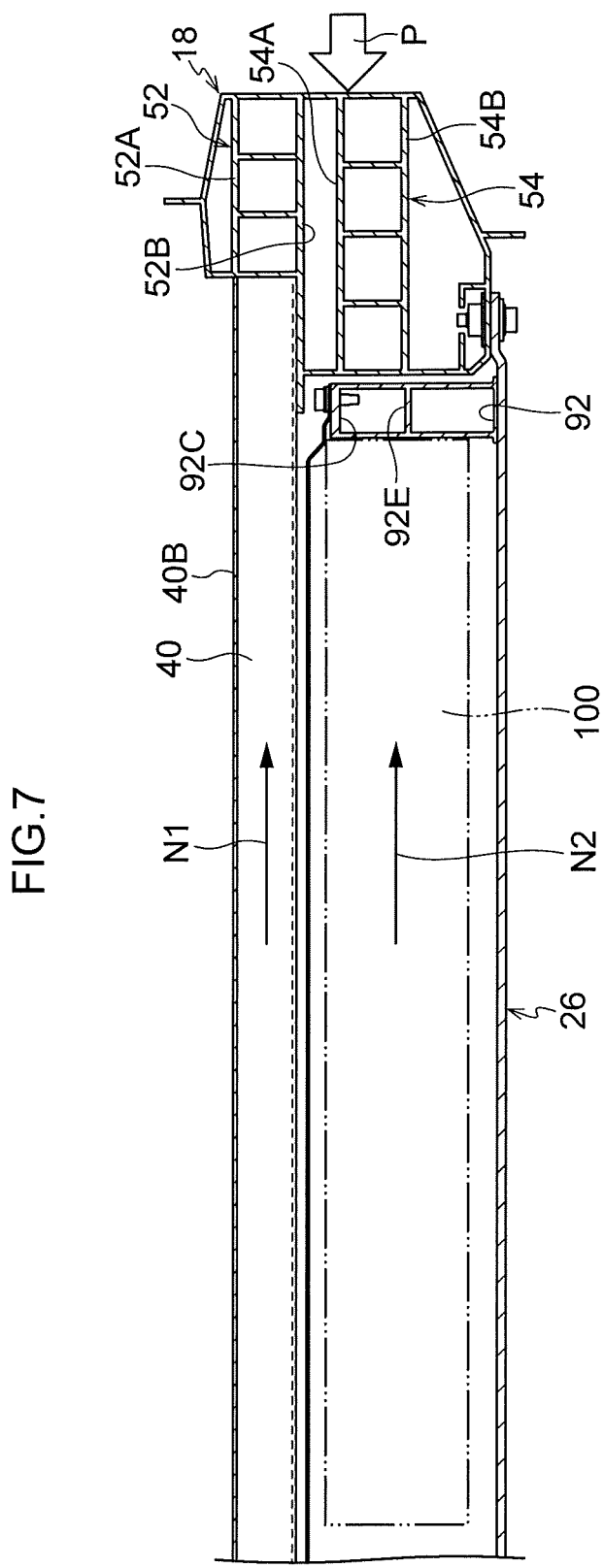

VEHICLE SIDE PORTION STRUCTURE

CROSS-REFERENCE TO RELATED APPLICATION

This application is based on and claims priority under 35 USC 119 from Japanese Patent Application No. 2017-153944 filed on Aug. 9, 2017, which is incorporated by reference herein.

BACKGROUND

Technical Field

The present disclosure relates to a vehicle side portion structure.

Related Art

Japanese Patent Application Laid-Open (JP-A) No. 2010-179898 discloses a technology relating to a battery vehicle-mounting structure. In this battery vehicle-mounting structure, a left and right pair of side frames are provided at a battery case housing a battery. The side frames oppose one another in a vehicle width direction and extend in a vehicle front-and-rear direction. A cross-member arranged in the vehicle width direction connects the left and right pair of side frames. The two end portions of the vehicle width direction of this cross-member are formed as high-strength portions, and a central portion of the vehicle width direction of the cross-member is formed as a low strength portion with a lower strength than the high-strength portions. Therefore, with this technology, when a side collision of the vehicle occurs (below, "during a side collision of the vehicle"), the low-strength portion deforms so as to be crushed, but deformation of the high-strength portions is suppressed and damage to the battery is suppressed.

However, in the technology recited in JP-A No. 2010-179898, when the cross-member is being formed, the low-strength portion and high-strength portions are integrated by welding. Thus, the structure of the cross-member is complex.

SUMMARY

An aspect of the present disclosure is a vehicle side portion structure that includes: a pair of rockers arranged at each of two outer sides of a vehicle width direction of a floor panel of a vehicle, the rockers extending in a vehicle front-and-rear direction; and a plurality of cross-members that are arranged with length directions thereof in the vehicle width direction, both length direction end portions of each cross-member being fixed to the pair of rockers, and the cross-members being disposed to be spaced in the vehicle front-and-rear direction, wherein a separation distance between neighboring cross-members in the vehicle front-and-rear direction is specified such that a bending reaction force of the rockers in response to an impact load applied during a side collision of the vehicle is equal to or greater than the impact load.

BRIEF DESCRIPTION OF DRAWINGS

FIG. 6 is a plan view, corresponding to FIG. 2, for describing operation of the vehicle in which the vehicle side portion structure according to the present exemplary embodiment is employed.

FIG. 7 is a descriptive diagram for describing operation of the vehicle in which the vehicle side portion structure according to the present exemplary embodiment is employed, which is a sectional diagram cut along line 4-4 in FIG. 2.

DESCRIPTION OF EMBODIMENTS

Figure 1:
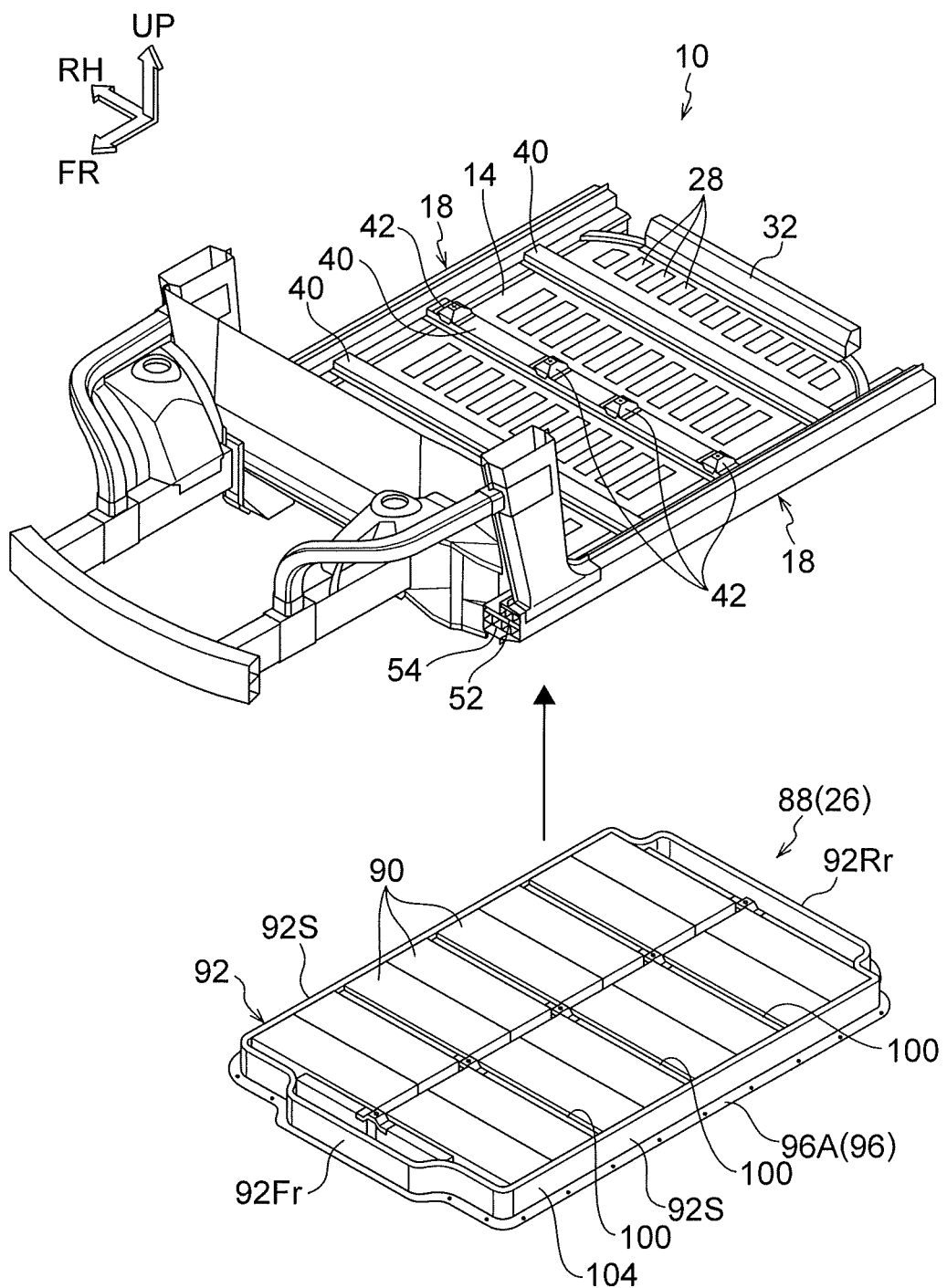
FIG. 1 is an exploded perspective view showing structures of a lower portion of a vehicle in which a vehicle side portion structure according to a present exemplary embodiment is employed.

Below, an electric vehicle in which a vehicle side portion structure according to an exemplary embodiment of the present disclosure is employed (below referred to simply as "the vehicle") is described using the attached drawings. An arrow FR, an arrow UP and an arrow RH that are shown where appropriate in the drawings represent, respectively, a front direction (progress direction), an up direction and a right direction of the vehicle. Below, where descriptions are given simply using directions to front and rear, left and right, and up and down, unless particularly specified, these refer to front and rear in the vehicle front-and-rear direction, left and right in the vehicle left-and-right direction (the vehicle width direction), and up and down in the vehicle up-and-down direction. Some of the reference symbols may be omitted in some of the drawings with a view to aiding understanding of the drawings.

—Structures of the Vehicle Side Portion Structure—

First, structures of the vehicle side portion structure according to the present exemplary embodiment are described. FIG. 1 is an exploded perspective view showing a lower portion of a vehicle body (vehicle) 10 at which the vehicle side portion structure according to the present exemplary embodiment is employed. As shown in FIG. 1, the vehicle 10 includes a floor panel 14, rockers 18, and a battery pack 26. These are described below, in this order.

—Structure of the Floor Panel—

Figure 2:
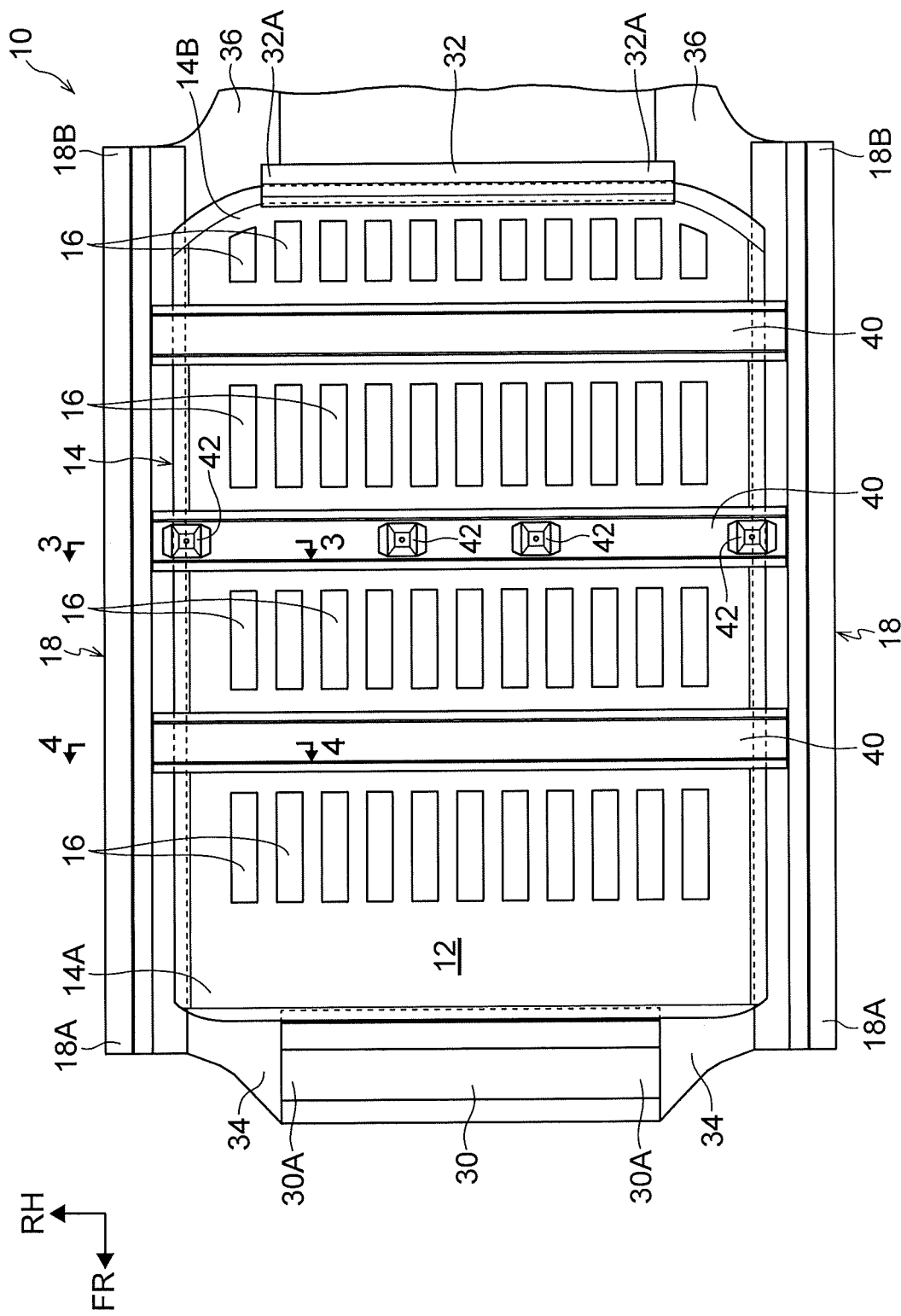
FIG. 2 is a plan view showing a floor panel and rockers of the vehicle in which the vehicle side portion structure according to the present exemplary embodiment is employed.

FIG. 2 is a plan view showing the floor panel 14 and rockers 18 of the vehicle 10. As shown in FIG. 1 and FIG. 2, in the vehicle 10, the floor panel 14 extends in the vehicle width direction and the vehicle front-and-rear direction. The floor panel 14 structures a floor portion of a vehicle cabin 12. A plural number of bead portions 16 are arrayed in the vehicle width direction on the floor panel 14. Each bead portion 16 protrudes discontinuously in the vehicle front-and-rear direction, forming substantially rectangular shapes in plan view. Fundamental rigidity of the floor panel 14 is improved by the formation of the bead portions 16.

The rockers 18 each extend in the vehicle front-and-rear direction at the two vehicle width direction outer sides of the floor panel 14. A front cross-member 30 extends in the vehicle width direction at a front end portion 14A of the floor panel 14. A rear cross-member 32 extends in the vehicle width direction at a rear end portion 14B of the floor panel 14.

Connecting members 34 are connected to each of both end portions 30A of the front cross-member 30. The front cross-member 30 is connected to each of front end portions 18A of the rockers 18 via the connecting members 34. Connecting members 36 are connected to each of both end portions 32A of the rear cross-member 32. The rear cross-member 32 is connected to each of rear end portions 18B of the rockers 18 via the connecting members 36.

The connecting members 34 and 36 are not necessarily required. The front cross-member 30 and the rear cross-member 32 may be formed such that the both end portions 30A of the front cross-member 30 and the both end portions 32A of the rear cross-member 32 are directly connected to the rockers 18.

On the floor panel 14 between the front cross-member 30 and the rear cross-member 32 in the vehicle front-and-rear direction, a plural number of floor cross-members 40 span between the two rockers 18 in the vehicle width direction. The floor cross-members 40 are fixed to the rockers 18 in this state. The floor cross-members 40 are arranged with a predetermined spacing in the vehicle front-and-rear direction. The bead portions 16 are formed so as not to interfere with the floor cross-members 40.

—Structure of the Rockers—

Figure 3:
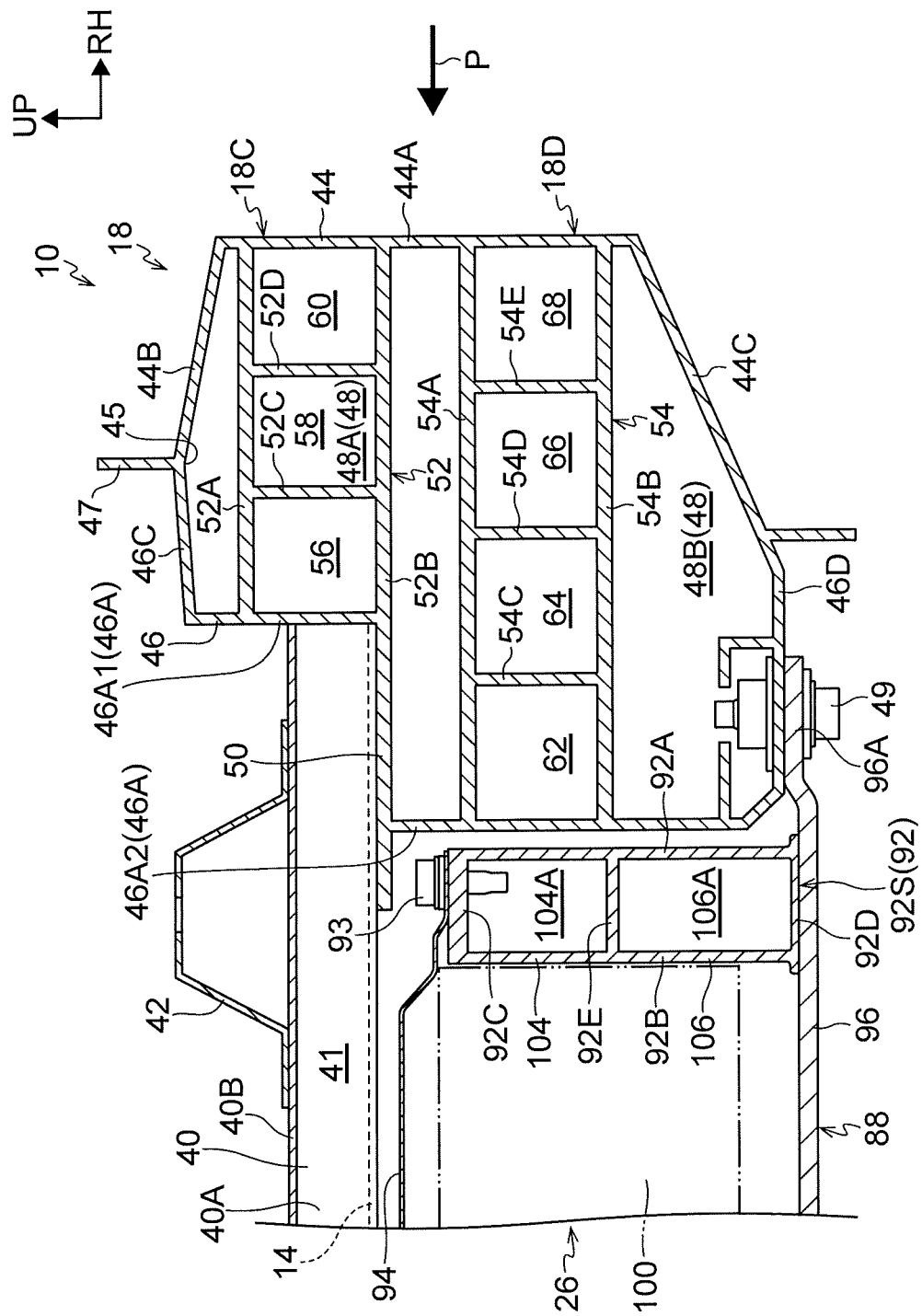
FIG. 3 is a magnified sectional diagram showing a magnification of a section cut along line 3-3 in FIG. 2.

FIG. 3 depicts a magnified sectional diagram showing a magnification of a section cut along line 3-3 in FIG. 2. As shown in FIG. 3, each rocker 18 includes an outer portion 44 disposed at the outer side in the vehicle width direction and an inner portion 46 disposed at the inner side in the vehicle width direction. The rocker 18 is formed of, for example, a metal such as an aluminium alloy or the like. The outer portion 44 and the inner portion 46 are formed integrally by extrusion, drawing or the like. A chamber portion 48 is formed by the outer portion 44 and the inner portion 46.

A cross-sectional shape of the outer portion 44 cut along the vehicle width direction includes an outer wall portion 44A, an inclined upper wall portion 44B and an inclined lower wall portion 44C. The outer wall portion 44A is formed along the vertical direction. The inclined upper wall portion 44B is provided at the upper side of the outer wall portion 44A and angled to the inner side in the vehicle width direction toward the upper side. The inclined lower wall portion 44C is provided at the lower side of the outer wall portion 44A and angled to the inner side in the vehicle width direction toward the lower side.

In a cross-sectional shape of the inner portion 46 cut along the vehicle width direction, an inner wall portion 46A formed along the vertical direction includes an upper side inner wall portion 46A1 and a lower side inner wall portion 46A2. The upper side inner wall portion 46A1 is formed along the vertical direction at an upper portion side of the inner portion 46. The lower side inner wall portion 46A2 is formed along the vertical direction at a lower portion side of the inner portion 46. The lower side inner wall portion 46A2 is disposed further to the vehicle width direction inner side than the upper side inner wall portion 46A1. A horizontal wall portion 50, which is formed in a substantially horizontal direction, is provided between the lower side inner wall portion 46A2 and the upper side inner wall portion 46A1.

An inclined upper wall portion 46C is provided at the upper side of the upper side inner wall portion 46A1. The inclined upper wall portion 46C is angled to the outer side in the vehicle width direction toward the upper side. The inclined upper wall portion 46C is formed so as to link up with the inclined upper wall portion 44B of the outer portion 44. A flange portion 47 extends toward the upper side from a vertex portion 45 at which the inclined upper wall portion 46C of the inner portion 46 and the inclined upper wall portion 44B of the outer portion 44 link up. A lower end portion of a pillar is joined to the flange portion 47.

A lower wall portion 46D is provided at the lower side of the lower side inner wall portion 46A2. The lower wall portion 46D is formed substantially in the horizontal direction toward the outer side in the vehicle width direction. The lower wall portion 46D is formed so as to link up with the inclined lower wall portion 44C of the outer portion 44. Fasteners 49 are insertable through the lower wall portion 46D. A joining flange 96A provided at the battery pack 26, which is described below, can be fastened to the rocker 18 via the fasteners 49.

The horizontal wall portion 50 links up the lower side inner wall portion 46A2 and upper side inner wall portion 46A1 that have different positions in the vehicle width direction. Thus, the inner wall portion 46A of the inner portion 46, including the horizontal wall portion 50, is formed in a crank shape. The horizontal wall portion 50 is further extended as far as the outer wall portion 44A of the outer portion 44. Thus, the rocker 18 is sectioned along the vehicle width direction by the horizontal wall portion 50, and the chamber portion 48 forming the interior of the rocker 18 is partitioned into an upper portion (upper portion chamber) 48A and a lower portion (lower portion chamber) 48B.

As described above, because the upper side inner wall portion 46A1 of the inner portion 46 is disposed further to the outer side in the vehicle width direction than the lower side inner wall portion 46A2, cross-sectional areas of an upper portion 18C and a lower portion 18D of the rocker 18 are different. In the present exemplary embodiment, the cross-sectional area of the lower portion 18D side of the rocker 18 is larger than the cross-sectional area of the upper portion 18C side of the rocker 18. Therefore, rigidity of the lower portion 18D side of the rocker 18 is higher than rigidity of the upper portion 18C side of the rocker 18.

An upper side cross portion 52 with a ladder profile forming chamber structures is provided inside the upper portion 18C of the rocker 18 (in the upper portion 48A of the chamber portion 48). A lower side cross portion 54 with a ladder profile forming chamber structures is provided inside the lower portion 18D of the rocker 18 (in the lower portion 48B of the chamber portion 48). The lower side cross portion 54 has a greater vehicle width direction dimension than the upper side cross portion 52.

The upper side cross portion 52 is provided with an upper wall 52A that spans substantially in the horizontal direction between the upper side inner wall portion 46A1 of the inner portion 46 and the outer wall portion 44A of the outer portion 44. A lower wall 52B of the upper side cross portion 52 is formed at the lower side of the upper wall 52A and opposes the upper wall 52A. The lower wall 52B links up with the horizontal wall portion 50.

A plural number (two in this exemplary embodiment) of connecting walls 52C and 52D span in the vertical direction between the upper wall 52A and the lower wall 52B. Plural chamber portions (small cavities 56, 58 and 60) are formed in the upper side cross portion 52 by these connecting walls 52C and 52D.

The lower side cross portion 54 is provided so as to overlap in a vehicle side view with cross-members (battery side cross-members 100) of the battery pack 26, which is described below. The lower side cross portion 54 is provided with an upper wall 54A that spans substantially in the horizontal direction between the lower side inner wall portion 46A2 of the inner portion 46 and the outer wall portion 44A of the outer portion 44. The upper wall 54A is provided so as to overlap in the vehicle side view with an upper wall portion 92C of a periphery wall 92 of the battery pack 26 described below.

A lower wall 54B of the lower side cross portion 54 is formed at the lower side of the upper wall 54A and opposes the upper wall 54A. The lower wall 54B is provided so as to overlap in the vehicle side view with a dividing wall portion 92E of the periphery wall 92 of the battery pack 26.

A plural number (three in this exemplary embodiment) of connecting walls 54C, 54D and 54E span in the vertical direction between the upper wall 54A and the lower wall 54B. Plural chamber portions (small cavities 62, 64, 66 and 68) are formed in the lower side cross portion 54 by these connecting walls 54C, 54D and 54E.

Because the lower side cross portion 54 has a greater dimension in the vehicle width direction than the upper side cross portion 52, the lower side cross portion 54 has a great number of chamber portions than the upper side cross portion 52, as described above. Rigidity of the lower side cross portion 54 is higher than rigidity of the upper side cross portion 52 by a corresponding amount. During a side collision of the vehicle 10, the upper side cross portion 52 and the lower side cross portion 54 absorb an impact by plastic deformation.

The upper side cross portion 52 is provided so as to overlap with each floor cross-member 40 in the vehicle side view. If, for example, the floor cross-member 40 is cut along the vehicle front-and-rear direction, a chamber portion 41 is formed. The floor cross-member 40 includes side walls 40A that oppose one another and an upper wall 40B that links upper ends of the side walls 40A with one another.

Figure 4:
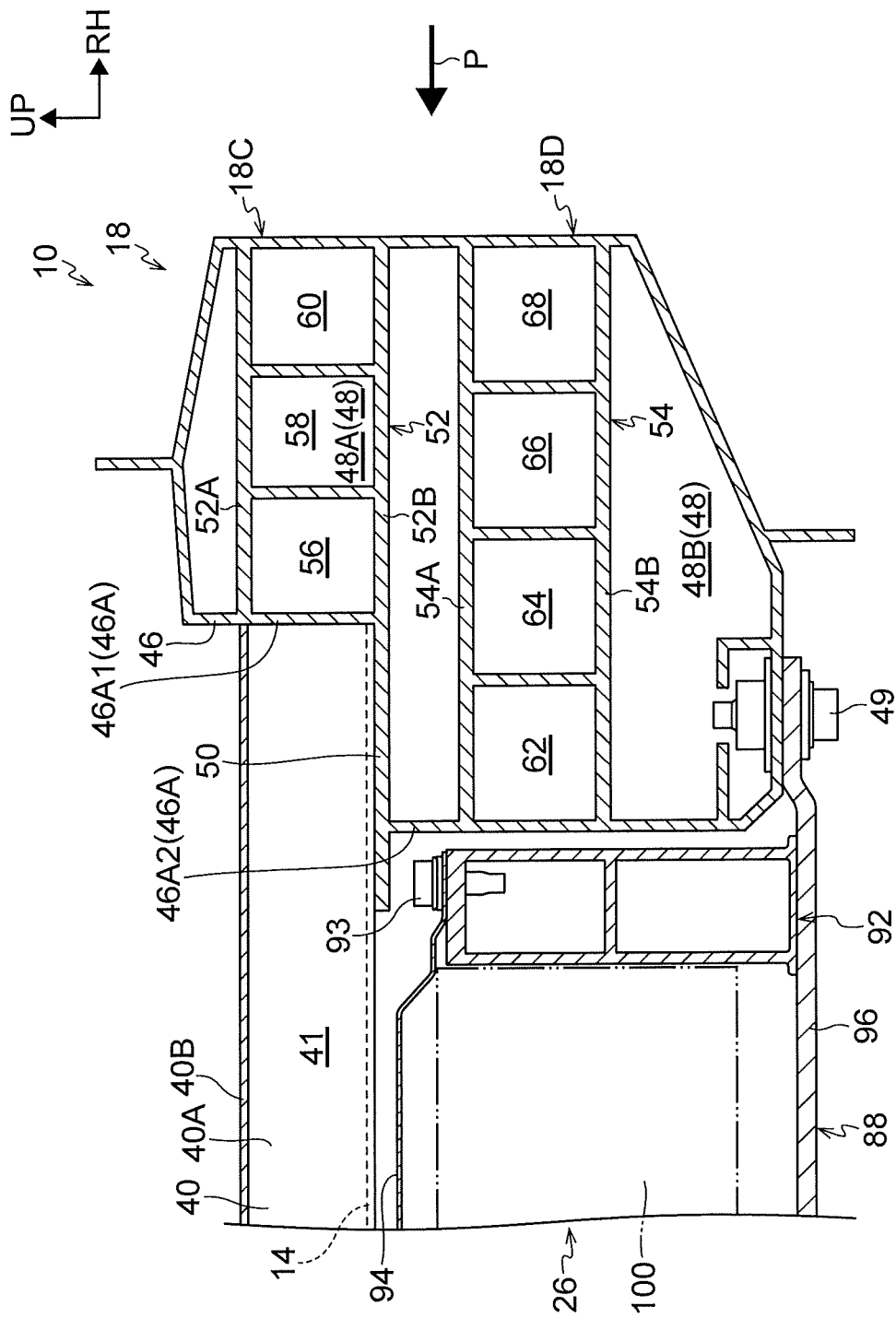
FIG. 4 is a magnified sectional diagram showing a magnification of a section cut along line 4-4 in FIG. 2.
Figure 5:
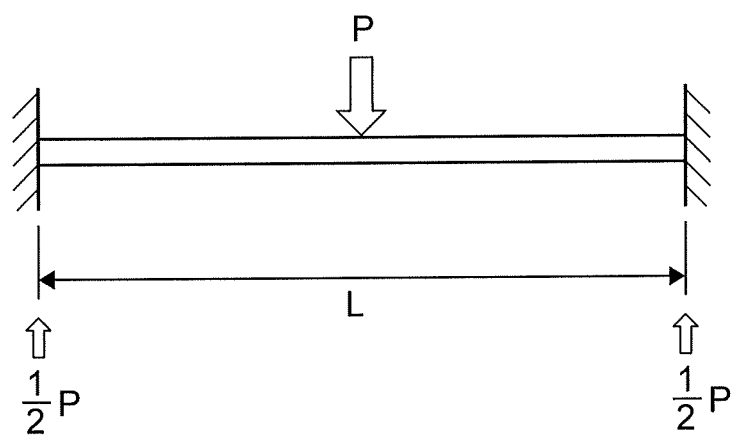
FIG. 5 is a diagram describing a general equation relating to a concentrated load acting on a fixed beam.

FIG. 3 depicts a sectional diagram of the floor cross-member 40 that, of the plural floor cross-members 40 shown in FIG. 2, is at a central portion in the vehicle front-and-rear direction. Brackets 42 for seats on which vehicle occupants are to sit are attached to the upper wall 40B of this floor cross-member 40. Accordingly, a height direction position of this upper wall 40B is lower than height direction positions of the upper walls 40B of the other floor cross-members 40. FIG. 4 depicts a sectional diagram of the floor cross-member 40 shown in FIG. 2 that is at the front portion side in the vehicle front-and-rear direction. The upper wall 40B of this floor cross-member 40 is provided so as to overlap with the upper wall 52A of the upper side cross portion 52 in the vehicle side view.

—Structure of the Battery Pack—

As shown in FIG. 1, the battery pack 26 is provided with a battery case 88 and a plural number of battery modules 90. The battery case 88 is formed in a box shape that is long in the vehicle front-and-rear direction and thin in the vehicle vertical direction. The battery modules 90 are accommodated inside the battery case 88. The battery modules 90 are structured by plural rectangular storage cells.

As shown in FIG. 1 and FIG. 3, the battery case 88 includes the periphery wall 92, a ceiling plate (cap portion) 94 (which is not shown in FIG. 1), and a floor plate 96. The periphery wall 92 is formed by, for example, a long, narrow extrusion-molded piece being formed by extrusion-molding of a lightweight metal such as an aluminium alloy or the like, the extrusion-molded piece being bent into a rectangular frame shape, and two length direction end portions of the periphery wall 92 being joined to one another. The periphery wall 92 forms a rectangular frame shape in plan view.

As shown in FIG. 1, the periphery wall 92 includes a left and right pair of side wall portions 92S, a front wall portion 92Fr and a rear wall portion 92Rr. The side wall portions 92S oppose one another in the vehicle width direction, and the front wall portion 92Fr and rear wall portion 92Rr oppose one another in the vehicle front-and-rear direction. The front wall portion 92Fr links together front ends of the pair of side wall portions 92S, and the rear wall portion 92Rr links together rear ends of the pair of side wall portions 92S. The battery side cross-members 100 span between the two side wall portions 92S at the side thereof at which an upper portion 104 of the periphery wall 92 (see FIG. 3) is disposed. The battery side cross-members 100 are disposed at equal spacings between the front wall portion 92Fr and the rear wall portion 92Rr.

As shown in FIG. 3, a cross section of the periphery wall 92 of the battery case 88 seen in a peripheral direction (the length direction of the aforementioned extrusion-molded piece) is formed in a substantial "B" shape. The periphery wall 92 is provided with an outer periphery wall portion 92A, an inner periphery wall portion 92B, the upper wall portion 92C, a lower wall portion 92D, and the dividing wall portion 92E. The outer periphery wall portion 92A forms an outer periphery face of the periphery wall 92. The inner periphery wall portion 92B forms an inner periphery face of the periphery wall 92. The upper wall portion 92C links upper end portions of the outer periphery wall portion 92A and the inner periphery wall portion 92B in the vehicle horizontal direction. The lower wall portion 92D links lower end portions of the outer periphery wall portion 92A and the inner periphery wall portion 92B in the vehicle horizontal direction. The dividing wall portion 92E links vertical direction middle portions of the outer periphery wall portion 92A and the inner periphery wall portion 92B in the vehicle horizontal direction. The periphery wall 92 is divided into the upper portion 104 and a lower portion 106 by the dividing wall portion 92E, which divides (partitions) an upper cavity 104A from a lower cavity 106A.

The ceiling plate 94 is formed by, for example, press-forming of a plate formed of a lightweight metal such as an aluminium alloy or the like. The ceiling plate 94 is fixed to an upper face of the upper wall portion 92C of the periphery wall 92 by plural bolts 93. The floor plate 96 is formed by, for example, press-forming of a plate formed of a lightweight metal such as an aluminium alloy or the like. The floor plate 96 is fixed to a lower face of the lower wall portion 92D of the periphery wall 92 by means such as welding, riveting or the like. As shown in FIG. 1, the joining flange 96A is provided at the floor plate 96 over the whole periphery of the periphery wall 92. The joining flange 96A projects in the vehicle horizontal direction further to vehicle outer sides than the periphery wall 92. The joining flange 96A is fastened together with (joined to) the left and right rockers 18 (see FIG. 3), being fixed to the rockers 18 in a state in which the battery case 88, which is to say the battery pack 26, is supported from the lower side by the floor plate 96.

—Operation and Effects of the Vehicle Side Portion Structure—

Now, operation and effects of the vehicle side portion structure according to the present exemplary embodiment are described.

In the present exemplary embodiment, as shown in FIG. 2, the plural floor cross-members 40 on the floor panel 14 are respectively fixed to the rockers 18 in states of spanning in the vehicle width direction between the two rockers 18 that are disposed to oppose one another.

In the present exemplary embodiment, treating each rocker 18 as beam members, respective both ends of the rocker 18 are fixed by the floor cross-members 40, and the rocker 18 can be understood as being what is known as "fixed beams". Accordingly, the relationship expressed by general equation (1) applies.

$$P=8Mz/L \tag{1}$$

In this expression, the symbol P represents a concentrated load acting on a beam, Mz represents a bending moment produced in the beam, and L represents a length of the beam (a separation distance between two fixed end ands). When this expression is applied to the present exemplary embodiment, as shown in FIG. 6, P may be substituted with an impact load applied during a side collision of the vehicle 10, Mz may be substituted with a bending moment produced in the rocker 18, and L may be substituted with the separation distance between the floor cross-members 40 that neighbor one another in the vehicle front-and-rear direction. The impact load P in this exemplary embodiment is a test load.

Accordingly, to suppress intrusion of a pole to the inner side in the vehicle width direction during a side collision of the vehicle 10, a bending reaction force (N) in the rocker 18 is specified so as to be equal to or greater than the impact load (P) that is applied.

Other conditions being equal, for example, increasing the plate thickness of a rocker or reducing the separation distance (L) between the neighboring floor cross-members 40 in the vehicle front-and-rear direction is sufficient to increase the bending reaction force (N) in the rocker 18. However, if the plate thickness of the rocker is increased, the weight of the vehicle body increases by a corresponding amount and fuel consumption is worsened. Moreover, if the separation distance between the floor cross-members 40 is reduced, the number of the floor cross-members 40 increases and the weight of the vehicle body increases by a corresponding amount.

Accordingly, in the present exemplary embodiment, the separation distance between the neighboring floor cross-members 40 in the vehicle front-and-rear direction is specified such that a bending force (N) in the rocker 18 is at least equal to an impact load (P) applied during a side collision of the vehicle 10. Hence, the bending force (N) in the rocker 18 that is required during a side collision of the vehicle 10 is assured. Thus, with a simple structure, a structure suitable for when a side collision of the vehicle 10 occurs may be obtained.

The number of the floor cross-members 40 may be reduced by making the separation distance L between the floor cross-members 40 as long as possible. When the separation distance L between the neighboring floor cross-members 40 in the vehicle front-and-rear direction is longer, freedom of design of space within the vehicle cabin 12 may be improved.

In the exemplary embodiment described above, the separation distance L in the vehicle front-and-rear direction between the neighboring floor cross-members 40 on the floor panel 14 is specified such that a bending reaction force (N) in the rocker 18 is equal to or greater than an impact load (P) applied during a side collision of the vehicle 10. However, the present exemplary embodiment is not limited thus.

For example, a separation distance in the vehicle front-and-rear direction between the neighboring battery side cross-members 100 inside the battery pack 26 shown in FIG. 1 may be specified. In this case, an impact load (P) applied during a side collision of the vehicle 10 may be dispersed between the upper portion 18C side of the rocker 18 shown in FIG. 3 and the lower portion 18D side of the rocker 18.

As shown in FIG. 3, in the present exemplary embodiment, the upper side cross portion 52 with a ladder profile is provided in the rocker 18, at the upper portion 18C side, and the lower side cross portion 54 with a ladder profile is formed at the lower portion 18D side in the rocker 18.

Thus, the fundamental rigidity of the rocker 18 may be increased by the upper side cross portion 52 and lower side cross portion 54 being formed in the rocker 18, and deformation of the rocker 18 may be suppressed. Hence, a collision may be absorbed by the upper side cross portion 52 and the lower side cross portion 54 plastically deforming during a side collision of the vehicle 10.

The upper side cross portion 52 is provided so as to overlap with the floor cross-members 40 in the vehicle side view, and the lower side cross portion 54 is provided so as to overlap with the battery side cross-members 100 of the battery pack 26 in the vehicle side view. Therefore, as illustrated in FIG. 7, when an impact load (P) is applied during a side collision of the vehicle 10, the upper side cross portion 52 may receive a reaction force (N1) from each floor cross-member 40, and the lower side cross portion 54 may receive a reaction force (N2) from each battery side cross-member 100.

Consequently, during a side collision of the vehicle 10, the upper side cross portion 52 and lower side cross portion 54 in the rocker 18 are reliably plastically deformed and an impact during the side collision of the vehicle 10 may be reliably absorbed. Thus, when the impact during the side collision of the vehicle 10 is absorbed by the upper side cross portion 52 and lower side cross portion 54 in the rocker 18, axial forces (the reaction forces N1 and N2) in the floor cross-members 40 and the battery side cross-members 100 are fundamentally moderated.

Therefore, separation distances between the neighboring floor cross-members 40 and between the neighboring battery side cross-members 100 in the vehicle front-and-rear direction may both be increased. Moreover, the axial forces (reaction forces N1 and N2) in the floor cross-members 40 and the battery side cross-members 100 are smaller loads than buckling loads of the floor cross-members 40 and the battery side cross-members 100 calculated in accordance with Euler's theorem.

In the present exemplary embodiment, as shown in FIG. 3, the cross-sectional area of the lower portion 18D side of the rocker 18 is greater than the cross-sectional area of the upper portion 18C side of the rocker 18, and the lower portion 18D side of the rocker 18 has higher rigidity than the upper portion 18C side of the rocker 18. Moreover, the lower side cross portion 54 has a greater dimension in the vehicle width direction than the upper side cross portion 52.

Thus, when the lower side cross portion 54 has a longer dimension in the vehicle width direction than the upper side cross portion 52, a deformation stroke during a side collision of the vehicle 10 is longer by a corresponding amount. Consequently, an impact energy absorption amount that the lower side cross portion 54 absorbs during a side collision is increased compared to the upper side cross portion 52.

Therefore, proportions of an impact load (P) applied during a side collision of the vehicle 10 that are borne by the upper portion 18C side of the rocker 18 and the lower portion 18D side of the rocker 18 may be varied. For example, the proportion that is borne by the lower portion 18D side of the rocker 18 may be specified to be larger than the upper portion 18C side of the rocker 18. In this case too, the deformation stroke of the lower portion 18D side may be lengthened and the energy absorption amount of the impact energy that is absorbed increased. Thus, deformation of the lower portion 18D side of the rocker 18 may be suppressed compared to the upper portion 18C side of the rocker 18, and a load that is transmitted to the battery pack 26 may be moderated.

In the present exemplary embodiment, the upper side cross portion 52 and lower side cross portion 54 respectively form chamber structures in the rocker 18. As a result, deformations of the upper side cross portion 52 and the lower side cross portion 54 are fundamentally suppressed compared to open cross-section structures.

Therefore, an impact load may be transferred over the whole of the upper side cross portion 52 and lower side cross portion 54, and the impact energy of a high load may be absorbed by the whole of the upper side cross portion 52 and lower side cross portion 54. That is, an impact energy absorption amount may be increased.

In particular in the present exemplary embodiment, because the upper side cross portion 52 and the lower side cross portion 54 each form a ladder profile in which plural chamber portions are contiguously formed, an impact load may be dispersed and the effect described above may be enhanced further.

In the present exemplary embodiment, because the floor cross-members 40 span between the two rockers 18 as shown in FIG. 2, during a side collision of the vehicle 10, each rocker 18 may receive reaction forces from the floor cross-members 40. Consequently, intrusion of a pole to the inner side in the vehicle width direction may be suppressed, and the rocker 18 and upper side cross portion 52 may be thoroughly plastically deformed and absorb impact energy effectively.

In the present exemplary embodiment, as shown in FIG. 1, the battery pack 26 is mounted to the vehicle lower side of the floor panel 14, and the battery side cross-members 100 in the battery pack 26 span between the side wall portions 92S of the periphery wall 92 that oppose one another in the vehicle width direction. Therefore, fundamental rigidity of the battery pack 26 may be improved in comparison with a structure in which the battery side cross-members 100 are not provided.

In the present exemplary embodiment, as shown in FIG. 7, the upper wall 54A of the lower side cross portion 54 in the rocker 18 is provided so as to overlap in the vehicle side view with the upper wall portion 92C of the periphery wall 92 of the battery pack 26, and the lower wall 54B of the lower side cross portion 54 in the rocker 18 is provided so as to overlap in the vehicle side view with the dividing wall portion 92E of the periphery wall 92 of the battery pack 26.

That is, in the present exemplary embodiment, edge lines of horizontal walls of the lower side cross portion 54 (the upper wall 54A and the lower wall 54B) in the rocker 18 and horizontal walls of the periphery wall 92 (the upper wall portion 92C and the dividing wall portion 92E) of the battery pack 26 are aligned in states that overlap in the height direction, and are provided continuously along the vehicle width direction.

Therefore, according to the present exemplary embodiment, when a portion of an impact load (P) is being transmitted from the rocker 18 to the battery pack 26 during a side collision of the vehicle 10, because the horizontal walls are continuous along the vehicle width direction, a reaction force (N2) from the battery pack 26 is received more effectively, the rocker 18 and the lower side cross portion 54 are thoroughly plastically deformed, and the impact may be absorbed more effectively.

Note, however, that the horizontal walls of the lower side cross portion 54 (the upper wall 54A and the lower wall 54B) in the rocker 18 and the horizontal walls of the periphery wall 92 (the upper wall portion 92C and the dividing wall portion 92E) of the battery pack 26 do not necessarily have to be continuous along the vehicle width direction.

In the present exemplary embodiment, the upper wall 52A of the upper side cross portion 52 is provided, for example, so as to overlap in the vehicle side view with the upper walls 40B of the floor cross-members 40. That is, in the present exemplary embodiment, edge lines of the upper wall 52A of the upper side cross portion 52 in the rocker 18 and the upper wall 40B of each floor cross-member 40 are aligned in states that overlap in the height direction, and the upper wall 52A and upper wall 40B are provided continuously along the vehicle width direction.

Therefore, according to the present exemplary embodiment, when a portion of an impact load (P) is being transmitted from the rocker 18 to the floor cross-member 40 during a side collision of the vehicle 10, because the upper wall 52A of the upper side cross portion 52 and the upper wall 40B of the floor cross-member 40 are continuous along the vehicle width direction, a reaction force (N1) from the floor cross-member 40 is received more effectively, the rocker 18 and the upper side cross portion 52 are thoroughly plastically deformed, and the impact may be absorbed more effectively.

Note, however, that the upper wall 52A of the upper side cross portion 52 in the rocker 18 and the upper wall 40B of the floor cross-member 40 do not necessarily have to be continuous along the vehicle width direction.

—Supplementary Descriptions of the Present Exemplary Embodiment—

In the present exemplary embodiment, as shown in FIG. 1, the battery pack 26 is mounted at the vehicle lower side of the floor panel 14, but the battery pack 26 is not necessarily required. Furthermore, the battery side cross-members 100 that are arranged along the vehicle width direction in the battery pack 26 are provided, but the battery side cross-members 100 are not necessarily required.

In the present exemplary embodiment, the upper side cross portions 52 in the rockers 18 are provided so as to overlap with the floor cross-members 40 in the vehicle side view. However, this overlap in the vehicle side view is not necessarily required. Furthermore, the upper side cross portions 52 are not necessarily required.

In the present exemplary embodiment, the lower side cross portions 54 in the rockers 18 are provided so as to overlap with the battery pack 26 in the vehicle side view. However, this overlap in the vehicle side view is not necessarily required. Furthermore, the lower side cross portions 54 are not necessarily required.

The cross-sectional area of the lower portion 18D side of the rocker 18 is larger than the cross-sectional area of the upper portion 18C side of the rocker 18, but this is not limiting. For example, the cross-sectional area of the side of the upper portion 18C side of the rocker 18 and the cross-sectional area of the lower portion 18D side of the rocker 18 may be substantially the same size.

In the present exemplary embodiment, descriptions are given taking a side collision with a pole as an example of a side collision of the vehicle 10. However, substantially the same effects as the effects provided by the present exemplary embodiment may be obtained in a side collision with a barrier.

In the present exemplary embodiment, the vehicle side portion structure according to the present exemplary embodiment is applied to the vehicle 10 in which the battery pack 26 is mounted. However, the battery pack 26 is not limiting. The vehicle side portion structure according to the present exemplary embodiment described above may be applied to a vehicle in which a fuel cell stack is mounted.

Hereabove, an exemplary embodiment has been described, but embodiments are not limited by the above descriptions. The exemplary embodiment and various variant examples may be employed in suitable combinations, and it will be clear that numerous modes may be embodied within a technical scope not departing from the gist of the present disclosure.

An object of the present disclosure is to provide a vehicle side portion structure that may, with a simple structure, provide a structure suitable for when a side collision of the vehicle occurs.

A first aspect is a vehicle side portion structure that includes: a pair of rockers arranged at each of two outer sides of a vehicle width direction of a floor panel of a vehicle, the rockers extending in a vehicle front-and-rear direction; and a plurality of cross-members that are arranged with length directions thereof in the vehicle width direction, both length direction end portions of each cross-member being fixed to the pair of rockers, and the cross-members being disposed to be spaced in the vehicle front-and-rear direction, wherein a separation distance between neighboring cross-members in the vehicle front-and-rear direction is specified such that a bending reaction force of the rockers in response to an impact load applied during a side collision of the vehicle is equal to or greater than the impact load.

In the vehicle side portion structure of the first aspect, the rockers are respectively disposed at the two outer sides of the vehicle width direction of the floor panel of the vehicle, and the rockers each extend in the vehicle front-and-rear direction. The cross-members are plurally arranged on the floor panel with the length directions thereof in the vehicle width direction. The two end portions of the length direction of each cross-member are fixed to the pair of rockers. The cross-members are disposed to be separated in the vehicle front-and-rear direction.

In the present disclosure, a separation distance between neighboring cross-members in the vehicle front-and-rear direction is specified such that a bending reaction force of each rocker in response to an impact load applied during a side collision of the vehicle is equal to or greater than the impact load. As described above, in the present disclosure the two end portions of the length direction of each cross-member are fixed to the pair of rockers.

Therefore, in the present disclosure, if each rocker is treated as beams, both ends of each beam are fixed by the cross-members, and the rocker can be understood as being what is known as "fixed beams". Accordingly, other conditions being equal, reducing the separation distance in the vehicle front-and-rear direction between the neighboring cross-members is sufficient to increase the bending reaction force of the rocker. However, when the separation distance between the cross-members is reduced, the number of cross-members increases, the weight of the vehicle body increases by a corresponding amount, and fuel consumption is worsened.

Therefore, in the present disclosure, a bending reaction force of the rocker that is required during a side collision of the vehicle is assured by specifying the separation distance between the neighboring cross-members in the vehicle front-and-rear direction such that the bending reaction force of the rocker is at least equal to an impact load applied during the side collision of the vehicle. Thus, with a simple structure, a structure suitable for when a side collision of the vehicle occurs may be obtained. The number of cross-members may be reduced by making the separation distance between the cross-members as long as possible. Moreover, because the separation distance between the neighboring cross-members in the vehicle front-and-rear direction is longer, freedom of design of space within a vehicle cabin may be improved.

In the present disclosure, the two end portions of the length direction of each cross-member are fixed to the pair of rockers. The cross-member may be fixed directly to each rocker, or the cross-member may be fixed indirectly in a state in which a separate member is interposed between the cross-member and the rocker. The "impact load applied during a side collision of the vehicle" is assumed to be a test load.

A second aspect is the first aspect of the vehicle side portion structure, in which the cross-members include floor cross-members on the floor panel that span in the vehicle width direction between the pair of rockers.

In the vehicle side portion structure of the second aspect, the cross-members are floor cross-members provided on the floor panel. Each floor cross-member spans between the pair of rockers in the vehicle width direction and is fixed to the rockers. Accordingly, in the present disclosure, each rocker is treated as beams and the separation distance between the neighboring floor cross-members in the vehicle front-and-rear direction is specified with the understanding that the rockers are fixed beams of which respective both ends are fixed by the floor cross-members.

A third aspect is the first or the second aspect of the vehicle side portion structure that further includes a battery housing body in which a storage battery is housed, the battery housing body being fixed to the pair of rockers at a vehicle lower side of the floor panel, and the battery housing body including a pair of side walls that oppose one another in the vehicle width direction, wherein the cross-members include a plurality of battery side cross-members in the battery housing body that span in the vehicle width direction between the side walls, the battery side cross-members being disposed to be spaced in the vehicle front-and-rear direction.

In the vehicle side portion structure of the third aspect, the battery housing body is provided at the vehicle lower side of the floor panel. A storage battery is housed in the battery housing body, and the battery housing body is fixed to the pair of rockers. Inside the battery housing body, the plural battery side cross-members span in the vehicle width direction between the side walls that oppose one another in the vehicle width direction. The battery side cross-members are disposed to be separated in the vehicle front-and-rear direction.

Because the battery side cross-members are provided inside the battery housing body that is fixed to the pair of rockers, the pair of rockers are linked via the battery housing interior. Therefore, in the present disclosure, the separation distance between the neighboring battery side cross-members in the vehicle front-and-rear direction is specified with the understanding that the rockers are fixed beams of which respective both ends are fixed by the battery side cross-members.

A fourth aspect is any of the first to the third aspect of the vehicle side portion structure that further includes, inside the rockers, cross portions that span between outer wall portions and inner wall portions of the rockers in the vehicle width direction, the cross portions being capable of absorbing an impact in a case in which a side collision of the vehicle occurs.

In the vehicle side portion structure of the fourth aspect, each cross portion spans between the outer wall portion and inner wall portion of the rocker in the vehicle width direction. Thus, an impact during a side collision of the vehicle may be absorbed by the cross portions.

Therefore, when an impact during a side collision of the vehicle is absorbed by the cross portions in a rocker, a load that is transmitted to the side of the rocker at which the cross-members are disposed is moderated. As a result, axial forces (reaction forces) borne by the cross-members are fundamentally moderated. Accordingly, the separation distance between the neighboring floor cross-members in the vehicle front-and-rear direction may be increased. Note that these cross portions may be formed integrally with the rockers and may be formed as separate members from the rockers.

A fifth aspect is the fourth aspect of the vehicle side portion structure in which the cross portions are disposed at positions that overlap with the cross-members in a vehicle side view.

In the vehicle side portion structure of the fifth aspect, because each cross portion is disposed at a location that overlaps with a cross-member in the vehicle side view, during a side collision of the vehicle, the cross portion may receive a reaction force from the cross-member. Therefore, during a side collision of the vehicle, the cross portion is reliably plastically deformed, and an impact during the side collision of the vehicle may be absorbed effectively.

Thus, because the impact during the side collision of the vehicle is absorbed, a load that is transmitted to the side at which the cross-members are disposed is moderated, and axial forces borne by the cross-members are fundamentally moderated. Accordingly, the separation distance between the neighboring cross-members in the vehicle front-and-rear direction may be increased.

A sixth aspect is the fourth or the fifth aspect of the vehicle side portion structure in which in a case in which each rocker is cut in the vehicle width direction, each rocker forms a chamber portion that includes an upper portion chamber that structures an upper portion of the chamber portion and a lower portion chamber that structures a lower portion of the chamber portion; and the cross portions include an upper side cross portion provided in the upper portion chamber and a lower side cross portion provided in the lower portion chamber.

In the vehicle side portion structure of the sixth aspect, if the rocker is cut along the vehicle width direction, the chamber portion is formed. The upper portion chamber is provided at the upper portion side of the chamber portion, and the lower portion chamber is provided at the lower portion side of the chamber portion. The cross portions include the upper side cross portion and the lower side cross portion. The upper side cross portion is provided inside the upper portion chamber of the rocker, and the lower side cross portion is provided inside the lower portion chamber of the rocker.

The floor cross-members and battery side cross-members spanning between the pair of rockers are disposed at the upper side and lower side of the floor panel with the floor panel therebetween. Therefore, because the rockers are divided into the upper portion chambers and the lower portion chambers and the respective upper side cross portions and lower side cross portions are provided, during a side collision of the vehicle, the upper side cross portions may receive reaction forces from the floor cross-members and the lower side cross portions may receive reaction forces from the battery side cross-members. Thus, the upper side cross portions and lower side cross portions may be more reliably plastically deformed during a side collision of the vehicle and an impact during the side collision of the vehicle may be more effectively absorbed than in a case in which the present structure is not employed.

Thus, because the impact during the side collision of the vehicle is more effectively absorbed, loads that are transmitted to the floor cross-members and the battery side cross-members are respectively moderated, and axial forces (reaction forces) borne by the floor cross-members and the battery side cross-members are fundamentally reduced. Accordingly, the separation distances between the neighboring floor cross-members and between the neighboring battery side cross-members in the vehicle front-and-rear direction may be increased. Note that the "chamber portion" referred to herein does not necessarily have a completely closed cross section.

A seventh aspect is the sixth aspect of the vehicle side portion structure in which a cross-sectional area of the lower portion chamber is larger than a cross-sectional area of the upper portion chamber, and the lower side cross portion is longer in the vehicle width direction than the upper side cross portion.

In the vehicle side portion structure of the seventh aspect, the lower portion chamber is formed with a greater cross-sectional area than the upper portion chamber. Thus, the lower portion side of the rocker has a higher rigidity than the upper portion side of the rocker. In addition, each lower side cross portion is formed to be longer in the vehicle width direction than the upper side cross portion.

Therefore, the lower side cross portion is specified so as to have a longer deformation stroke during a side collision of the vehicle than the upper side cross portion, and such that an impact energy absorption amount in the lower side cross portion is larger by a corresponding amount. The battery housing body is provided at the lower portion side of the rockers. Accordingly, because rigidity of the lower portion side of each rocker is made higher than rigidity of the upper portion side and an impact energy absorption amount at the lower portion side of the rocker during a side collision of the vehicle is larger, a load that is applied to the battery housing body may be moderated.

The vehicle side portion structure according to the first aspect may, with a simple structure, provide a structure suitable for when a side collision of the vehicle occurs.

In the vehicle side portion structure according to the second aspect, a separation distance between neighboring floor cross-members in the vehicle front-and-rear direction may be specified with the understanding that the rockers act as fixed beams of which respective both ends are fixed by the floor cross-members.

In the vehicle side portion structure according to the third aspect, a separation distance between neighboring battery side cross-members in the vehicle front-and-rear direction may be specified with the understanding that the rockers act as fixed beams of which respective both ends are fixed by the battery side cross-members.

In the vehicle side portion structure according to the fourth aspect, an impact during a side collision of the vehicle may be absorbed by the cross portions in the rockers.

In the vehicle side portion structure according to the fifth aspect, the cross portions may receive reaction forces from the cross-members, be reliably plastically deformed, and absorb an impact during a side collision of the vehicle.

In the vehicle side portion structure according to the sixth aspect, during a side collision of the vehicle, the upper side cross portions and lower side cross portions may receive reaction forces from, respectively, the floor cross-members and the battery side cross-members, and may absorb an impact during the side collision of the vehicle.

In the vehicle side portion structure according to the seventh aspect, because the rigidity of the lower portion side of each rocker may be made higher than the rigidity of the upper portion side, in addition to which an energy absorption amount of impact energy that the lower portion side absorbs during a side collision of the vehicle may be made larger, a load applied to the battery housing body may be moderated.

What is claimed is:

1. A vehicle side portion structure comprising:
    a pair of rockers arranged at each of two outer sides of a vehicle width direction of a floor panel of a vehicle, the rockers extending in a vehicle front-and-rear direction; and
    a plurality of cross-members that are arranged with length directions thereof in the vehicle width direction, both length direction end portions of each cross-member being fixed to the pair of rockers, and the cross-members being disposed to be spaced in the vehicle front-and-rear direction,
    wherein a separation distance L is specified so as to satisfy $L \leq 8\ Mz/P$ when L represents the separation distance between neighboring cross-members in the vehicle front-and-rear direction, P represents a predefined input load input during a side collision of the vehicle and Mz represents a bending moment of the rockers.

2. The vehicle side portion structure according to claim 1, wherein the cross-members include floor cross-members on the floor panel that span in the vehicle width direction between the pair of rockers.

3. The vehicle side portion structure according to claim 1, further comprising a battery housing body in which a storage battery is housed, the battery housing body being fixed to the pair of rockers at a vehicle lower side of the floor panel, and the battery housing body including a pair of side walls that oppose one another in the vehicle width direction,
    wherein the cross-members include a plurality of battery side cross-members in the battery housing body that span in the vehicle width direction between the side walls, the battery side cross-members being disposed to be spaced in the vehicle front-and-rear direction.

4. The vehicle side portion structure according to claim 1, further comprising, inside the rockers, cross portions that span between outer wall portions and inner wall portions of the rockers in the vehicle width direction, the cross portions being capable of absorbing an impact in a case in which a side collision of the vehicle occurs.

5. The vehicle side portion structure according to claim 4, wherein the cross portions are disposed at positions that overlap with the cross-members in a vehicle side view.

6. The vehicle side portion structure according to claim 4, wherein:
    in a case in which each rocker is cut in the vehicle width direction, each rocker forms a chamber portion that includes an upper portion chamber that structures an upper portion of the chamber portion and a lower portion chamber that structures a lower portion of the chamber portion; and
    the cross portions include an upper side cross portion provided in the upper portion chamber and a lower side cross portion provided in the lower portion chamber.

7. The vehicle side portion structure according to claim 6, wherein:
    the upper side cross portion is disposed at a position that overlaps with floor cross-members in a vehicle side view; and
    the lower side cross portion is disposed at a position that overlaps with a battery housing body in the vehicle side view.

8. The vehicle side portion structure according to claim 6, wherein a cross-sectional area of the lower portion chamber is larger than a cross-sectional area of the upper portion chamber, and the lower side cross portion is longer in the vehicle width direction than the upper side cross portion.

* * * * *